Aug. 4, 1953     O. P. ERHARDT     2,647,745
DISPENSER FOR PRESSURE-SENSITIVE TAPE
Filed Sept. 26, 1951     2 Sheets-Sheet 1

INVENTOR
Oscar P. Erhardt
BY
ATTORNEYS

Aug. 4, 1953 — O. P. ERHARDT — 2,647,745
DISPENSER FOR PRESSURE-SENSITIVE TAPE
Filed Sept. 26, 1951 — 2 Sheets-Sheet 2

INVENTOR
Oscar P. Erhardt
BY
Rockwell & Bartholow
ATTORNEYS

Patented Aug. 4, 1953

2,647,745

UNITED STATES PATENT OFFICE 2,647,745

DISPENSER FOR PRESSURE-SENSITIVE TAPE

Oscar P. Erhardt, Derby, Conn., assignor to Derby Sealers, Incorporated, Derby, Conn., a corporation of Connecticut Application September 26, 1951, Serial No. 248,330

10 Claims. (Cl. 271—2.3)

This invention relates to tape-dispensing machines and more particularly to a machine for dispensing pressure-sensitive tape or tape which is tacky upon one side.

The dispensing of tape of this character is attended with greater difficulty than that of gummed tape as the tacky surface will cling to any part of the mechanism with which it comes in contact and, therefore, will adhere to a feeding member which is used to draw it from the supply roll. However, advantage may be taken of this characteristic of the tape as it will cling to a feed roll or like feeding member, and by moving the latter the tape may be drawn from the supply roll.

If, however, the dispensed portion of the tape is to present a free end projecting from the machine so that it may be grasped by the fingers and torn off against a tear-off blade, it is necessary to provide some means for stripping the tape from the feeding device, and it is contemplated by the present invention to provide novel mechanism for stripping the tape from the feeding means so that a positive stripping action will be effected and at the same time a relatively few parts employed so that a compact dispensing mechanism may be provided.

As illustrated, the feeding device comprises a rotatably mounted drum-like member having at its periphery a plurality of spaced elements extending substantially transversely of the path of the tape but not truly transversely in that they are directed helically to a slight extent. The tacky side of the tape adheres to these spaced bars and is drawn from the supply roll when the drum is rotated. The stripping means, as illustrated, is likewise rotatable and comprises a plurality of star wheels rotatably mounted upon a shaft fixed in the frame. Each of these star wheels comprises a hub member having a plurality of radially directed fingers or arms. The shaft upon which the star wheels are mounted is so disposed relatively to the center of the feeding drum that the fingers or arms upon the star wheel will project outwardly through the spaces between the spaced feed elements on the drum and engage the tape to strip it from the feed drum.

Also, the arrangement is such that the spaced feed elements on the drum will engage the arms or fingers of the star wheels and serve to rotate the latter so that no separate driving means is required for the stripping mechanism. Moreover, when the spaced feed elements are helically directed, as illustrated, and the spaces between them similarly directed, the corresponding arms or fingers of the star wheels which project through these spaces will stand in a helical line which will be conducive to smooth and continual rotation of the star wheel as one of the arms of each thereof will always be in engagement with one of the spaced bars of the feeding mechanism.

It will also be noted that the speed of the edges of the radial arms of the stripping elements will be greater than that of the spaced bars as the latter contact these arms at points between the axis of the arms and the ends thereof which engage the tape. This will strip the arms from the tape so that the free end of the latter will stand outwardly to be grasped by the fingers and will not be carried around to be re-engaged with the feed element.

One object of the invention is to provide a new and improved device for dispensing pressure-sensitive tape.

A further object of the invention is to provide a device for dispensing pressure-sensitive tape which comprises a feed member to engage the tacky side of the tape and draw it from the supply roll and a stripping means to strip the tape from the feeding member, the latter being engaged and driven by the feed member.

A still further object of the invention is to provide a tape-dispensing machine of the type described above which will have relatively few parts and will be of compact form so that it may be economically made and occupy relatively small amount of space.

A still further object of the invention is to provide a tape-dispensing mechanism comprising a tape-feeding wheel or element having a plurality of spaced members extending transversely of the tape to engage the tacky side of the same and draw it from the feed roll, and a stripping element having a plurality of blades or paddles, which stripping element is mounted within the orbit of said spaced members and extends through the spaces between such members to engage the tape and strip it from the feeding member.

To these and other ends the invention consists in the novel features and combinations of parts to be hereinafter described and claimed.

Figure 1:
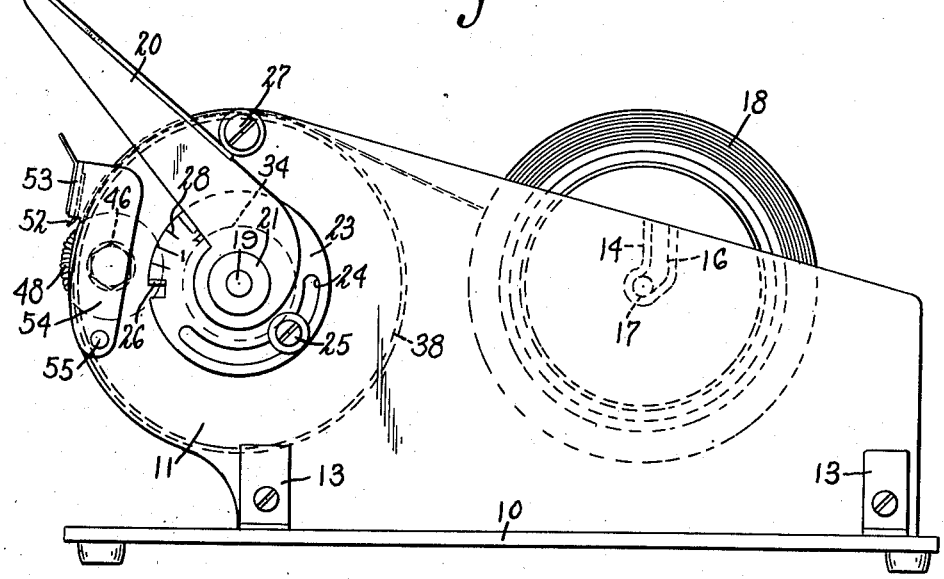
Fig. 1 is a side elevational view of a tape-dispensing mechanism embodying my invention.
Figure 2:
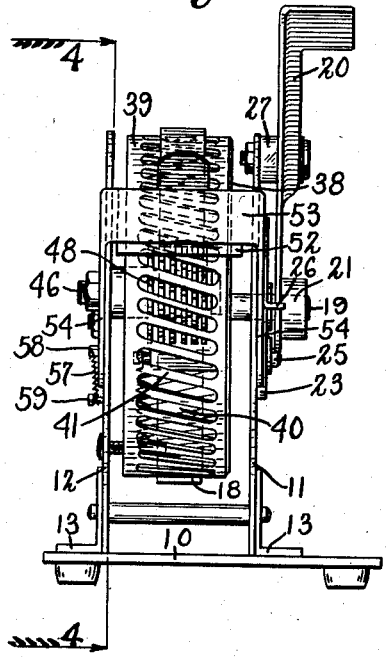
Fig. 2 is a front elevational view thereof.

To illustrate a preferred embodiment of my invention I have shown in the drawings a tape-dispensing mechanism comprising a frame having a base 10 and spaced upstanding members 11 and 12, these members being secured to the base in any suitable manner such as by angle brackets 13. Adjacent their rear ends the members 11 and 12 may be provided with supporting lugs 14, which lugs are provided with grooves 16 to receive and hold the spindle 17 of the spool of the supply roll of tape 18.

Figure 5:
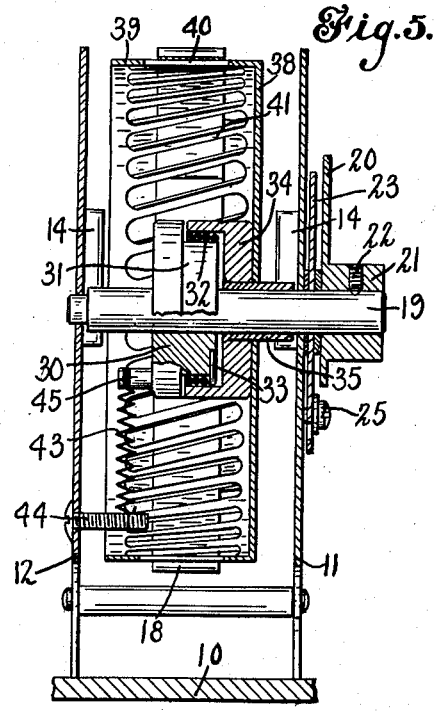
Fig. 5 is a sectional view on line 5—5 of Fig. 4.
Figure 6:
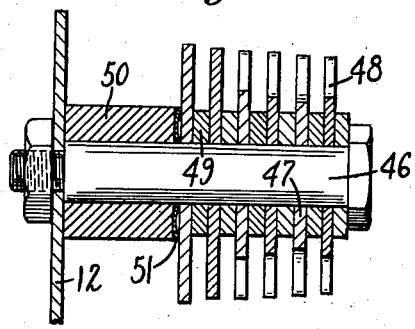
Fig. 6 is a sectional view on line 6—6 of Fig. 4.

Adjacent the forward end of the frame a shaft 19 is rotatably mounted in the plates 11 and 12 (Fig. 5) and to this shaft is secured a crank or lever 20, the crank being provided with a hub 21 through which is threaded the securing set screw 22. Rotatably mounted on the shaft between the lever 20 and the plate 11 is a stop disk 23 (Fig. 1) having an arcuate slot 24 designed to receive an adjusting screw 25 threaded into the member 11 so that upon loosening of the screw, the stop disk 23 may be rotatably adjusted as permitted by the slot 24.

The disk 23 is provided with a stop lug 26 which is adapted to engage the lever 20 when the latter is moved in a feeding or counter-clockwise direction, as shown in Fig. 1. When the lever is moved in the opposite direction its movement is limited by the stop member 27. In this way a measured amount of tape may be dispensed, and the stop disk 23 is provided with indications 28 so that the operator may set the disk to dispense the desired amount.

Secured to or formed integrally with the shaft 19 is a hub or disk 30 having a reduced portion 31 embraced by an expanding spring 32, one end of which is secured to the member 31, as shown at 33. The spring 32 is received within a spring barrel or drum 34 which is secured to a sleeve 35 rotatably mounted upon the shaft 19. As will be understood, this constitutes a one-way driving connection between the shaft 19 and the spring barrel or drum 34 so that when the shaft is rotated in a direction to expand the spring, the member 34 will also be rotated, but when the shaft is rotated in the other direction, the spring will slip freely about the interior of the barrel and the latter will not be driven.

Secured to the barrel or drum 34 is the feed element of the device which comprises a drum having a wall 38 and a rim 39. The rim is provided with a plurality of slots 40 which are slightly helically disposed so as to provide between these slots a plurality of helically disposed bars or feed elements 41. The slots 40 are elongated so as to be as long or longer than the width of the tape to be dispensed but are not cut through the edge of the rim. It will be seen that the bars 41 engage the inner or tacky surface of the tape at spaced points so that the latter adheres thereto and when the feed element is rotated by movement of the handle or lever 20 in a forward or counter-clockwise direction, as shown in Fig. 1, the tape will be drawn from the roll in a length determined by the setting of the stop disk 23.

In order that the lever 20 may be normally urged in a clockwise direction against the stop member 27, as shown in Fig. 1, a spring 43 is secured at one end to a pin 44 in the frame member 12, and at its other end to a pin 45 secured to the member 30. Therefore, when the operator releases the lever, the spring 43 will restore it to its normal position against the stop 27.

In order to strip the tape from the feed elements or bars 41, a stripper is provided which will now be described. Secured to the frame member 12 is a stud or bolt 46, and upon this stud or shaft are rotatably mounted a plurality of star wheels each of which comprises a hub portion 47 and radially disposed fingers or arms 48. These wheels are spaced apart on the shaft 46 by spacing collars 49 and are spaced from the frame 12 by the relatively long spacing collar 50. A spring 51 mounted on the shaft 46 between the spacing collar 50 and the adjacent star wheel maintains a certain amount of pressure on the entire series of wheels, and thus places a slight restraint upon them against movement. In other words, this spring will normally restrain these wheels against rotation unless a positive rotating force is applied thereto.

Figure 4:
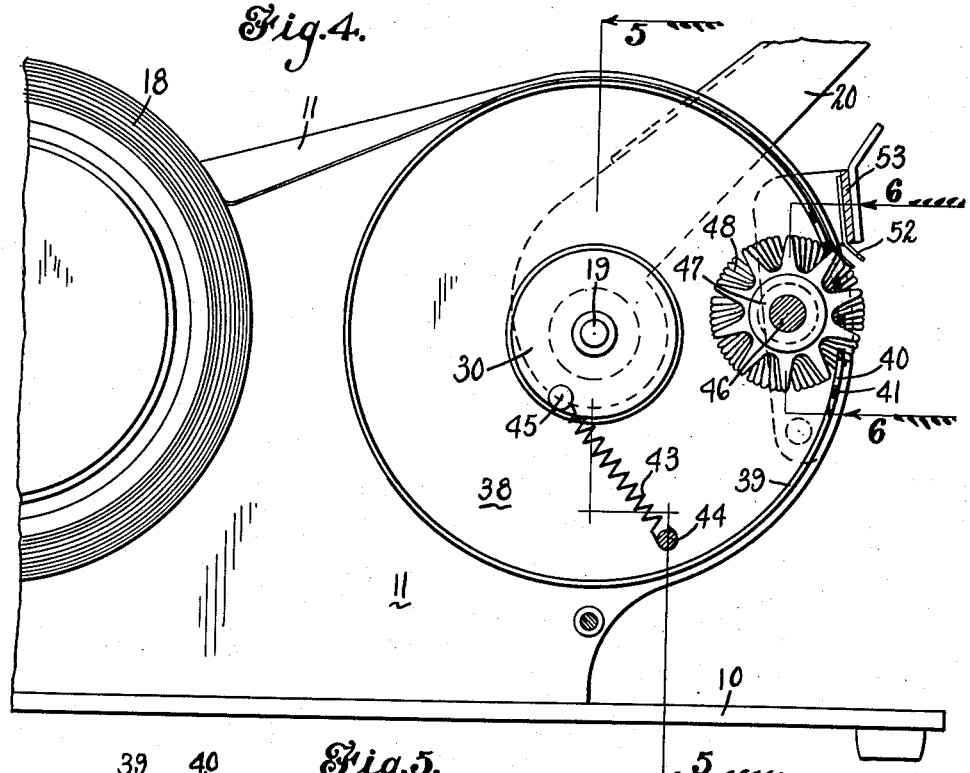
Fig. 4 is a partial sectional view on line 4—4 of Fig. 2.

As shown in Fig. 4 of the drawings, the stripping mechanism so disposed relatively to the rim 39 of the feed element that the fingers 48 of these wheels will project through the closed elongated slots 40 and engage the tacky side of the tape to strip it from the feed elements or feed bars 41. Also, each of these bars will engage the fingers of the star wheels so as to effect rotation of the latter to enable them to strip the tape from the feed drum. With this arrangement, no gears or other driving means will be required to drive the stripping elements, and as one of the feed bars 41 will at all times be in engagement with one or more of the fingers of the star wheels of the stripping mechanism, the device will operate smoothly and effectively.

Figure 3:
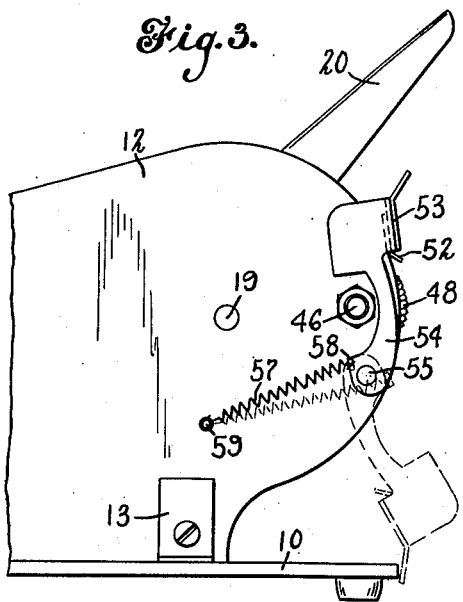
Fig. 3 is an elevational view of the front portion of the device showing the side thereof opposite to that shown in Fig. 1.

In order that the dispensed length of tape may be severed, a knife or severing member is provided, as shown at 52. This member is secured to the bight portion 53 of a U-shaped frame, the legs 54 of which are pivoted to the frame members 11 and 12 at 55 (Figs. 1 and 3). The frame is shown in its normal position in Fig. 1 and in full lines in Fig. 3, and it will be seen that in this position the tearing edge of the knife 52 stands in relatively close proximity to the tape. When, however, it is desired to "load" the machine or to place therein a fresh supply of tape, the knife frame may be swung from the full-line position to the dotted-line position shown in Fig. 3 so that free access is provided to the rim 39 of the feed drum in order that the new length of tape will be engaged with the bars 41. A spring 57 is secured to a lug 58 on the knife frame and the other end of this spring is secured at 59 to the plate 12 so that the spring will serve to releasably hold the knife frame in either the full or dotted-line position to which it is moved, the spring passing dead center position with respect to the pivot 55 when the frame is moved from one position to another.

It is believed that the operation will be clear from the foregoing, but it may be briefly stated that when it is desired to dispense tape from the machine the lever 20 is drawn forwardly or in a counterclockwise direction, as shown in Fig. 1, thus serving to rotate the feed drum to which the tacky side of the tape adheres. The bars 41 of the drum engaging the arms 48 of the star wheels will cause the latter to rotate, and these arms will project outwardly through the elongated slots 40 to strip the tape from the feed drum. The length will be determined by the setting of the stop disk 23, and when the feed is stopped by the stop lug 26, the lever 20 is released and returned to its original position against the stop 27. The operator then grasps the free end of the tape which projects from the machine and tears it off against the blade 52.

While I have shown and described a preferred embodiment of my invention, it will be understood that it is not to be limited to all of the details shown, but is capable of modification and variation within the spirit of the invention and within the scope of the claims.

What I claim is:

1. In a machine for dispensing pressure-sensitive tape, a frame, a feed member movably mounted on the frame, said member having spaced feeding elements extending across the path of, and engaging, the tape, stripping means comprising a shaft, a plurality of stripping elements mounted on said shaft for independent rotation thereon, said stripping elements being disposed in side-by-side relation longitudinally of the shaft, and each of said stripping elements having salient formations thereon engaged by said feed elements and projecting between and beyond the feed elements from the side thereof opposite that engaged by the tape to effect rotation of the stripping elements.

2. In a machine for dispensing pressure-sensitive tape, a frame, a feed member rotatably mounted on the frame, said member having spaced feeding elements extending across the path of the tape, stripping means comprising a shaft, a plurality of stripping elements mounted on said shaft for independent rotation thereon, said shaft being mounted within the periphery of the feed member, said stripping elements being disposed in side-by-side relation longitudinally of the shaft and each of said stripping elements having projections thereon extending radially outwardly between and beyond said feeding elements.

3. In a machine for dispensing pressure-sensitive tape, a frame, a feed member rotatably mounted on the frame, said member having spaced feeding elements extending across the path of the tape, stripping means comprising a shaft, a plurality of stripping elements mounted on said shaft for independent rotation thereon, said stripping elements being disposed in side-by-side relation longitudinally of the shaft, said shaft being mounted within the periphery of the feeding elements, and each of said stripping elements having radially projecting arms extending outwardly between and beyond said feeding elements to be engaged and driven thereby.

4. In a machine for dispensing pressure-sensitive tape, a frame, a feed member rotatably mounted on the frame, said member having spaced feeding elements extending across the path of the tape, stripping means comprising a shaft mounted within the periphery of the feeding elements, a series of stripping elements rotatably mounted on said shaft and spaced longitudinally thereof, each of said elements comprising a hub, and a series of radially projecting arms extending outwardly between and beyond the feeding elements.

5. In a machine for dispensing pressure-sensitive tape, a frame, a feed member rotatably mounted on the frame, said member having spaced feeding elements extending across the path of the tape, stripping means comprising a shaft, a plurality of stripping elements mounted on said shaft for independent rotation thereon, said stripping elements being disposed in side-by-side relation longitudinally of the shaft, each of said stripping elements having salient formations thereon and projecting between and beyond the feeding elements to be engaged by said feed elements to effect rotation of the stripping elements, said feed member comprising a rotatable drum having a peripheral rim extending in an axial direction, said shaft being mounted within the periphery of the rim, and said rim having slots therein to provide the spaced feeding elements between said slots.

6. In a machine for dispensing pressure-sensitive tape, a frame, a feed member rotatably mounted on the frame, said member having spaced feeding elements extending across the path of the tape, stripping means comprising a shaft, a plurality of stripping elements mounted on said shaft for independent rotation thereon, said stripping elements being disposed in side-by-side relation longitudinally of the shaft, each of said stripping elements having salient formations thereon and projecting between and beyond the feed elements to be engaged by said feed elements to effect rotation of the stripping elements, said feed member comprising a rotatable drum having a peripheral rim extending in an axial direction, said shaft being mounted within the periphery of the rim, said rim having slots therein to provide the spaced feeding elements between said slots, and said slots being directed helically of said rim.

7. A machine for dispensing pressure-sensitive tape comprising a frame, a feeding mechanism carried by the frame comprising a rotatable element having spaced feed bars, said feed bars being disposed across the path of the tape and obliquely thereto, stripping means mounted on the frame, said stripping means comprising a shaft mounted within the periphery of said rotatable element, and a plurality of star wheels loosely mounted on said shaft for individual rotation thereon, the arms of said star wheels extending outwardly between and beyond said feed bars to be engaged and driven thereby.

8. A machine for dispensing pressure-sensitive tape comprising a frame, a feeding mechanism carried by the frame comprising a rotatable element having spaced feed bars, said feed bars being disposed across the path of the tape and obliquely thereto, stripping means mounted on the frame, said stripping means comprising a shaft mounted within the periphery of said rotatable element, a plurality of star wheels loosely mounted on said shaft for individual rotation thereon, the arms of said star wheels extending outwardly between and beyond said feed bars to be engaged and driven thereby, and means spacing said star wheels apart on said shaft.

9. A machine for dispensing pressure-sensitive tape comprising a frame, a feeding mechanism carried by the frame comprising a rotatable element having spaced feed bars, said feed bars being disposed across the path of the tape and obliquely thereto, stripping means mounted on the frame, said stripping means comprising a shaft mounted within the periphery of said rotatable element, and a plurality of star wheels loosely mounted on said shaft for individual rotation thereon, the arms of said star wheels extending outwardly between and beyond said feed bars to be engaged and driven thereby, and a spring member pressing against said star wheels to provide resistance to the rotation thereof.

10. A machine for dispensing pressure-sensitive tape, said device comprising a frame, a feed drum rotatably mounted on said frame having a rim disposed substantially parallel to the axis of the drum, said rim having slots formed therein obliquely to the axis thereof to provide spaced tape-feeding bars between said slots, stripping means rotatably mounted on the frame, said stripping means comprising a shaft mounted within the periphery of the rim and a plurality of stripping elements rotatably mounted thereon, each of said elements being a substantially flat member comprising a hub portion and radially extending arms, and said arms projecting outwardly through said slots in the rim of the drum and beyond said bars to be engaged by said tape-engaging bars.

OSCAR P. ERHARDT.

References Cited in the file of this patent

UNITED STATES PATENTS

| Number | Name | Date |
| --- | --- | --- |
| 1,832,007 | Eckland et al. | Nov. 17, 1931 |
| 1,972,851 | McCarthy | Sept. 4, 1934 |
| 2,044,182 | Ott | June 16, 1936 |
| 2,507,446 | Krueger | May 9, 1950 |
| 2,573,911 | Krueger | Nov. 6, 1951 |